(12) United States Patent
Pan

(10) Patent No.: US 6,633,921 B1
(45) Date of Patent: Oct. 14, 2003

(54) INTELLIGENT NETWORK CONNECTING APPARATUS

(75) Inventor: Wen-Chang Pan, Taipei (TW)

(73) Assignee: Aten International Co. Ltd., Taipei (TW)

( * ) Notice: Subject to any disclaimer, the term of this patent is extended or adjusted under 35 U.S.C. 154(b) by 0 days.

(21) Appl. No.: 09/478,735

(22) Filed: Jan. 6, 2000

(51) Int. Cl.⁷ .......................... G06F 15/16; G06F 13/38
(52) U.S. Cl. ........................................ 709/250; 710/70
(58) Field of Search ................ 709/250, 220; 710/70

(56) References Cited

U.S. PATENT DOCUMENTS

| | | | | |
|---|---|---|---|---|
| 4,393,430 A | * | 7/1983 | Hughes | 361/92 |
| 5,469,135 A | * | 11/1995 | Solow | 340/426 |
| 5,847,666 A | * | 12/1998 | Yasoshima et al. | 341/58 |
| 6,049,880 A | * | 4/2000 | Song | 713/300 |
| 6,147,603 A | * | 11/2000 | Rand | 340/568.2 |
| 6,159,039 A | * | 12/2000 | Wu | 439/541.5 |
| 6,344,836 B1 | * | 2/2002 | Suzuki | 345/2.1 |
| 6,363,491 B1 | * | 3/2002 | Endo | 713/310 |
| 6,370,603 B1 | * | 4/2002 | Silverman et al. | 709/220 |

* cited by examiner

Primary Examiner—David Wiley
Assistant Examiner—Joseph E Avellino
(74) Attorney, Agent, or Firm—Baker Botts LLP

(57) ABSTRACT

An intelligent network connecting apparatus for serving as a terminal of network includes a female Ethernet connector, female USB connector, converting means, and auto-detecting switch. While a computer couples with the female Ethernet connector, signals would directly communicate between the computer and a remote network. When the computer couples with the female USB connector, the auto-detecting switch would automatically couple the converting means with the network. Meanwhile, the signals passing through the female USB connector would be sent to the converting means and transformed in forms of between USB standard and Ethernet standard, thereby ensuring the signals communicating between the computer and the network.

14 Claims, 3 Drawing Sheets

US 6,633,921 B1

INTELLIGENT NETWORK CONNECTING APPARATUS

FIELD OF THE INVENTION

This invention relates to a network socket, especially to an intelligent network connecting apparatus with a female Ethernet connector and female USB connector for coupling the two connectors to a network by automatically detecting the state that denotes which connector has been connected with a computer.

BACKGROUND OF THE INVENTION

With the wide spread of personal computer and rapid development of network, how to simplify the procedure of connecting personal computers to networks turns to be a huge need in the field of computer engineering. For contending this need, many architectures have built network sockets, which are fixed on walls or structures of architectures, for allowing users to connect their computers with the network by plunging Ethernet cables into the network sockets. Thus, the users could easily access information of networks by coupling their computers with the network sockets even in many public places, such as restaurants and hotels. Even more, these networks of public places can further connect to Internet, thus providing better services for users.

Typically, the network socket includes a standard female RJ-45 connector, a female connector of 8-wire cable. Usually when connecting a personal computer to the network, the computer needs to add an extra interface card to provide network ports. However, some personal computers without the extra interface card can't directly employ the network socket to connect with the network.

For resolving the above shortcoming, a traditional converting box coupling with between the network socket and I/O ports of personal computer transforms signals into the Ethernet standard, thereby connecting the personal computer to the network. For example, an Universal Serial Bus (USB)/Ethernet converting box exchanging signals in forms of between Ethernet standard and USB standard allows the personal computer to connect with the network. Although the USB/Ethernet converting box allows the personal computer to connect with the network, in many cases, it's a burden for the users who usually travel in many places. Therefore, the intelligent network connecting apparatus is proposed to solve the problem due to the extra converting box for communicating signals in different information standards.

SUMMARY OF THE INVENTION

The object of this invention is to provide an intelligent network connecting apparatus for facilitating the computer to couple with a remote network by either Ethernet connector or USB connector.

An intelligent network connecting apparatus for serving as a terminal of network includes a panel, female Ethernet connector, female USB connector, converting means, and auto-detecting switch. The female Ethernet connector and USB connector are mounted on the panel together, which is fixed on walls or structures of architectures for enclosing the converting means and auto-detecting switch in the structure. As an alternative, the converting means and auto-detecting switch could be encased in a box, on which the panel with an Ethernet connector and USB connector are mounted. While a computer couples with the female Ethernet connector, signals directly communicate between the computer and a remote network. When the computer couples with the female USB connector, the auto-detecting switch would automatically couple the converting means with the network. Meanwhile, the signals passing through the female USB connector would be sent to the converting means and transformed in forms of between USB standard and Ethernet standard, thereby ensuring the signals communicating between the computer and the network.

DETAILED DESCRIPTION OF THE PREFERRED EMBODIMENT

This invention discloses an intelligent network connecting apparatus, which has a female Ethernet connector, such as a standard female RJ-45 connector, and female USB connector. When a computer, such as desktop, laptop, palm computer, and personal digital assistant, couples with the female Ethernet connector of the intelligent network connecting apparatus, it will be able to directly access the information form the network. On the other hand, when the computer couples with the female USB connector, the signals passing through the female USN connector would be automatically converted in forms of between an Ethernet standard and USB standard, thereby electrically connecting the computer with the network. In various applications, the intelligent network connecting apparatus may have many different female connectors, but the following embodiment employs only two female connectors for clearly illustrating this invention. In addition, the intelligent network connecting apparatus may be implanted on to a structure of architecture as a multi-ports socket or encased in a box as a mobile switch device between Ethernet standard and USB standard as an alternative. The following paragraphs illustrate a preferred embodiment according to this invention.

Figure 1:
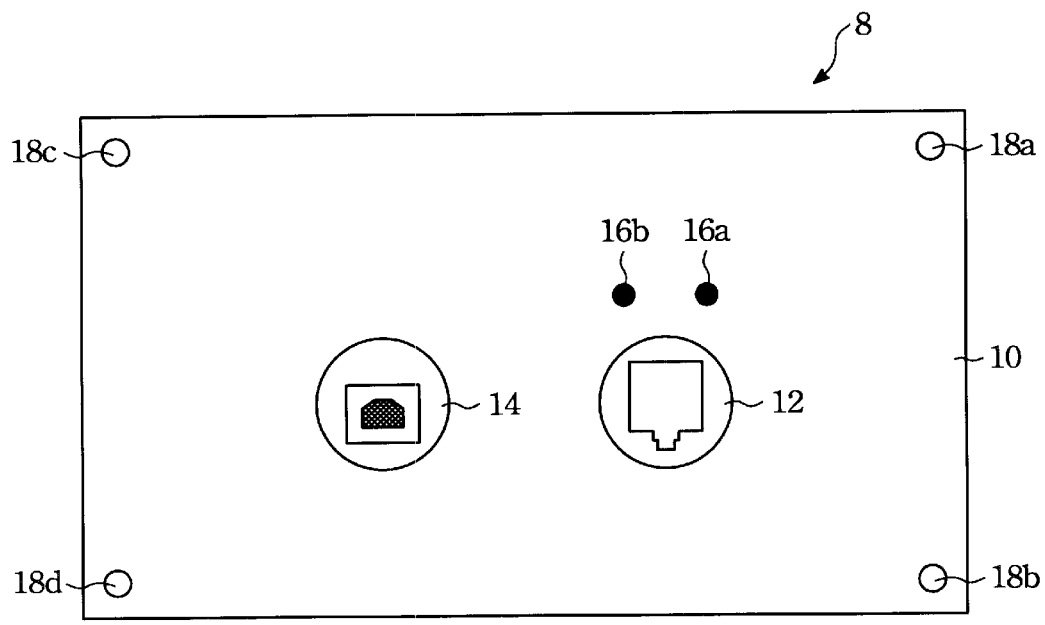
FIG. 1 is a front view of the present intelligent network connecting apparatus.

FIG. 1 shows a front view of the intelligent network connecting apparatus 8. A female Ethernet connector 12 and female USB connector 14 are mounted on a panel 10, which is fixed on walls or structures of architectures by fixers 18a, 18b, 18c, 18d, such as screws and nails. The female Ethernet connector 14 receives an Ethernet cable for allowing a computer to connect with the network. Likewise, the female USB connector 14 allows the computer to connect with the network by receiving its USB line. Moreover, Light Emitted Diodes (LED) 16a, 16b are fixed on the surface of panel 10 for indicating which connectors is currently in use. When any one of the connectors is in use, the correspondent LED would light up to show the status. In this preferred embodiment, the female Ethernet connector 12 is a standard female RJ-45 connector. However, the female coaxial cable connector could also be employed as an alternative.

Figure 2:
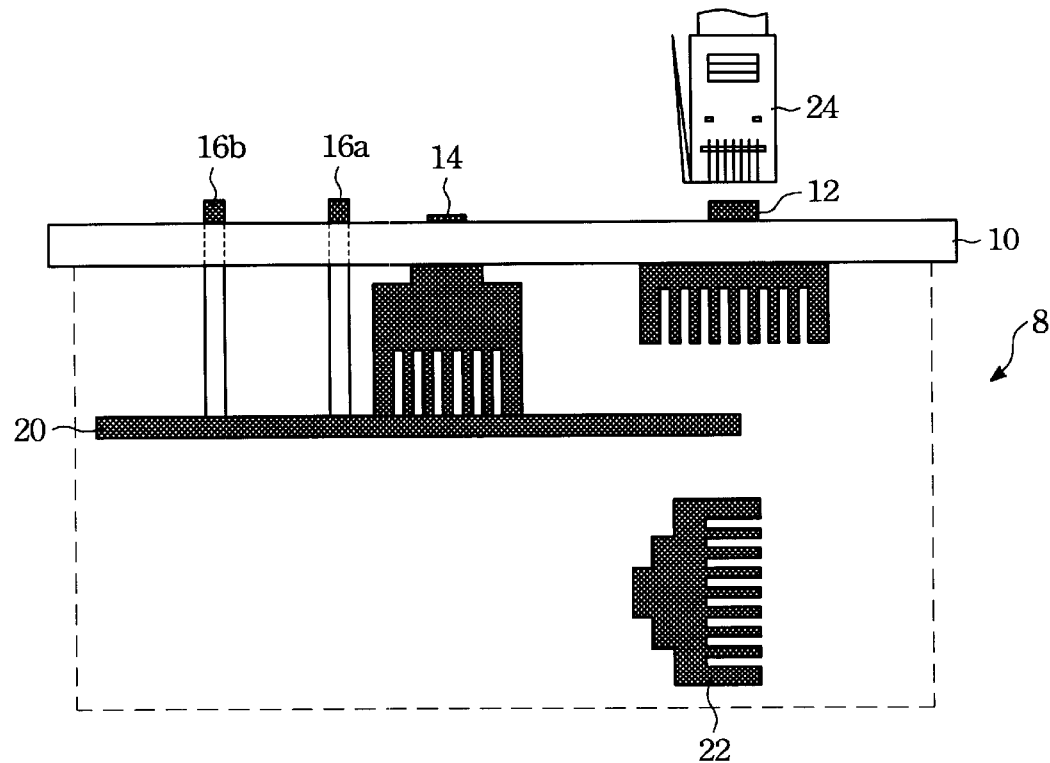
FIG. 2 is side view of the present intelligent network connecting apparatus.

FIG. 2 is a side view of the intelligent network connecting apparatus 8. An USB-to-Ethernet board 20 connecting with the female USB connector 14 converts the signals importing form the female USB connector 14 into signals in a form of Ethernet standard, which is also the standard for transmitting signals through the female Ethernet connector 12. Likewise, the USB-to-Ethernet board 20 converts the signals transmitting to the female USB connector 14 into a form of USB standard. When the computer couples with female USB connector 14, an auto-detecting switch (not shown in this figure) couples the USB-to-Ethernet board 10 to an internal network terminal 22, thereby allowing the computer to send signals to the network in Ethernet standard. Since, the auto-detecting switch is mainly in charge of automatically detecting and coupling the connector in use with the network, the intelligent network connecting apparatus 8 adapts to both the Ethernet connector and USB connector. For instance, when a computer couples with the female Ethernet connector 12, the intelligent network connecting apparatus 8 will directly connect it to the internal network terminal 22. When the computer couples with the female USB connector 14, the intelligent network connecting apparatus 8 will convert its signals into Ethernet standard by the USB-to-Ethernet board 20 and automatically couple with the internal network terminal 22. In this preferred embodiment, the USB-to-Ethernet board 20 can be acquired from ATEN International Co., Ltd., Taiwan. The auto-detecting switch could selectively integrated within the USB-to-Ethernet board 20 or fabricated as an independent module.

Figure 3:
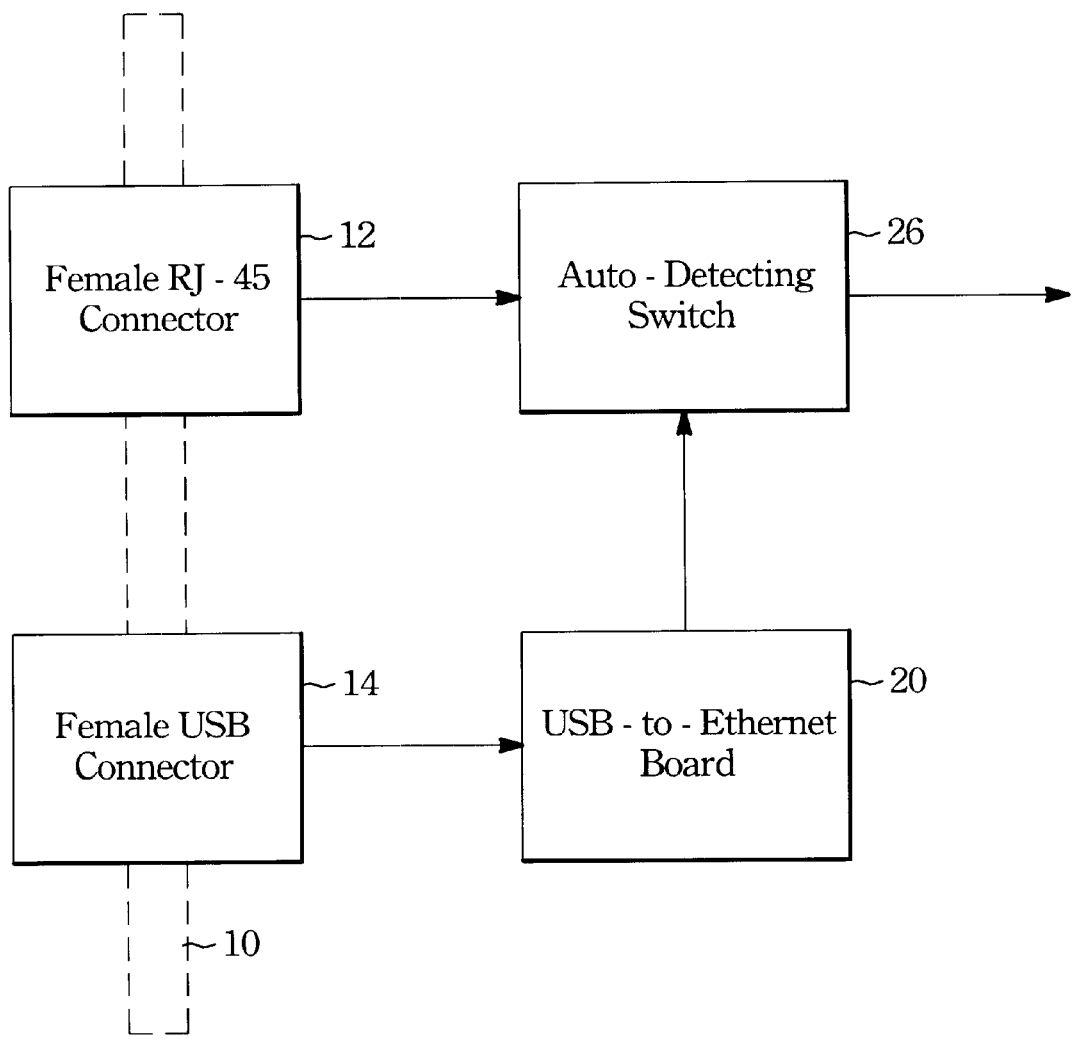
FIG. 3 is a functional-block diagram of the present intelligent network connecting apparatus.

FIG. 3 describes a functional block diagram of the intelligent network connecting apparatus. The female Ethernet connector 12 and USB connector 14 are mounted on the panel 10. In the left side of panel 10, the female Ethernet connector 12 and USB connector 14 respectively receive the Ethernet cable and USB line for coupling with the computer. In the right side of panel 10, the USB-to-Ethernet board 20 and auto-detecting switch 26 are buried into walls or structures of architecture. The female Ethernet connector 12 directly connects with the auto-detecting switch 26, and the USB indirectly connects to the auto-detecting switch 26 through the USB-to-Ethernet switch. When the female Ethernet connector 12 is in use, the auto-detecting switch 26 directly bridges the signals passing through the female Ethernet connector 12 with the network. When the female USB connector is in use, the signals passing through the female USB connector 14 are converted in forms of between USB standard and Ethernet standard by the USB-to-Ethernet board 20. Meanwhile, the auto-detecting switch 26 automatically responds the signals and bridges them with the network. Thus, users may connect their computers to the network without carrying extra converting boxes wherever the intelligent network connecting apparatus existed.

Figure 4:
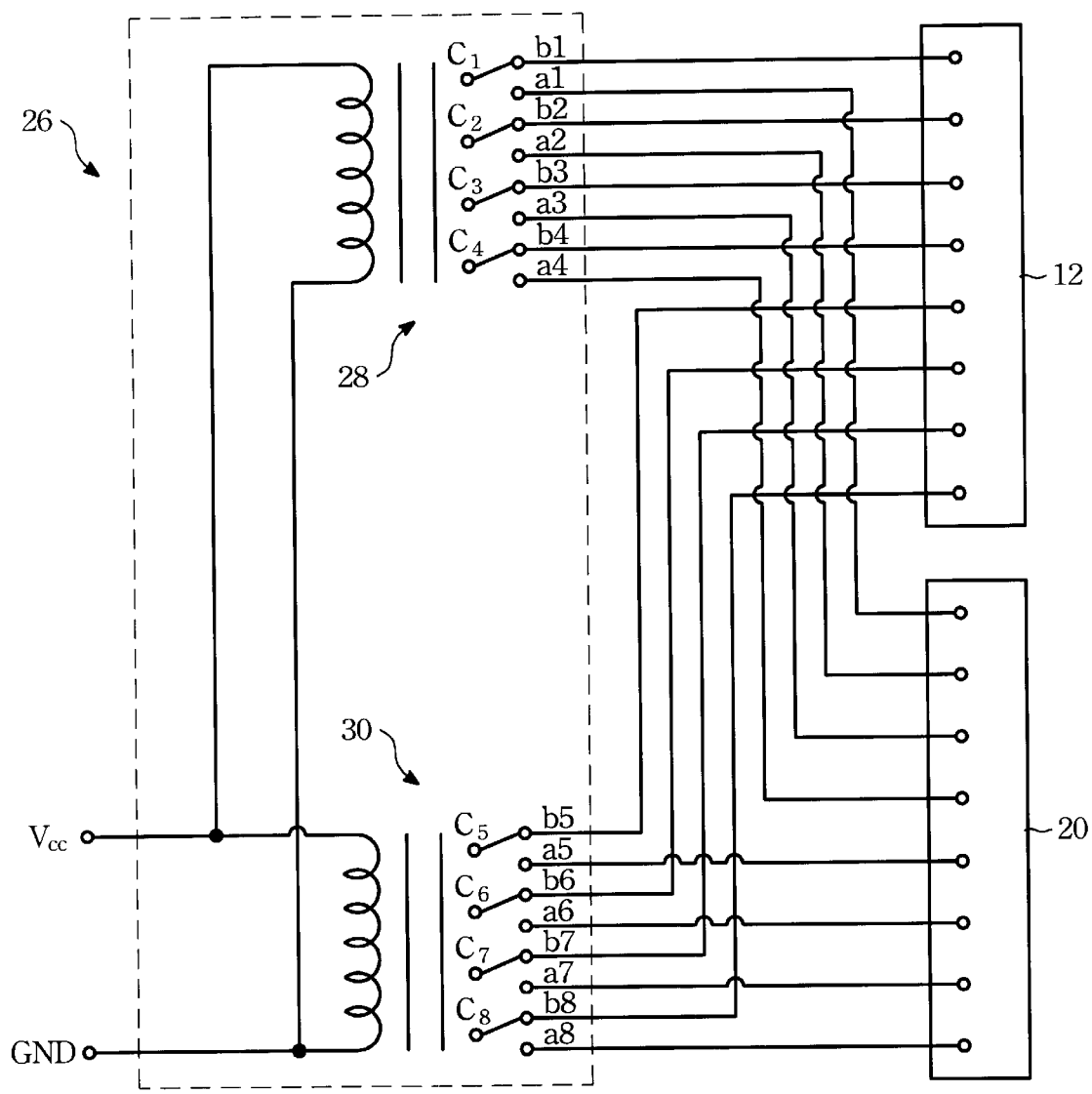
FIG. 4 is a circuitry of an auto-detecting switch of the present intelligent network connecting apparatus.

FIG. 4 describes a circuitry as an embodiment of the aforementioned auto-detecting switch 26. Typically, the female Ethernet connector 12 has 8 wires, and each of them connects to nodes b1, b2, ... b8, which are normally closed with respect to common nodes c1, c2, ... c8 that couple with the network. Likewise, for converting signals between USB standard and Ethernet standard, the USB-to-Ethernet board 20 also has 8 wires and connects to nodes a1, a2, ... a8, which are normally open with respect to the common nodes c1, c2, ... c8. Therefore, while the female Ethernet connector 12 couples with a computer, the signals will freely communicate between the computer and network. If the computer couples with the female USB connector (not shown in this figure), since the signals from the female USB connector provides a electric power Vcc and reference potential GND, the relays 28, 30 would automatically respond the electric power Vcc and switch the nodes c1, c2, ... c3, to connect with a1, a2, ... a3. Thus, the computer would automatically couple with the network through the female USB connector, USB-to-Ethernet board 20, and auto-detecting switch 26.

As is understood by a person skilled in the art, the foregoing preferred embodiments of the present invention that are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An intelligent network connecting apparatus for serving as a terminal of network, the intelligent network connecting apparatus comprising:

a female Ethernet connector for receiving a male Ethernet connector to couple the intelligent network connecting apparatus with a computer;

a female universal-serial-bus connector for receiving a male universal-serial-bus connector to couple the intelligent network connecting apparatus with the computer;

a converting means coupling the female universal-serial-bus connector for converting signals in forms of between a universal-serial-bus standard and an Ethernet standard; and an auto-detecting switch coupling with the female Ethernet connector and the converting means, while the computer connects with the female universal-serial-bus connector to send an electric power Vcc and a reference potential GND to the auto-detecting switch, the auto-detecting switch connecting the computer to the network through the converting means automatical, or while the computer connects with the female Ethernet connector, the auto-detecting switch connecting the computer to the network.

2. The intelligent network connecting apparatus of claim 1, wherein the female Ethernet connector is a standard female RJ-45 connector.

3. The intelligent network connecting apparatus of claim 1, wherein the female Ethernet connector and the female universal-serial-bus connector are fabricated on a same panel.

4. The intelligent network connecting apparatus of claim 3, wherein the panel is mounted on a wall of architecture.

5. The intelligent network connecting apparatus of claim 3, wherein the panel, the converting means, and the auto-detecting switch are implanted as a mobile switch device.

6. The intelligent network connecting apparatus of claim 3, further comprising an LED device on the panel for indicating which connector between the female Ethernet connector and the female universal-serial-bus connector has been used.

7. The intelligent network connecting apparatus of claim 1, wherein the auto-detecting switch is a relay.

8. The intelligent network connecting apparatus of claim 7, wherein the relay is automatically switching the female Ethernet connector or the female universal-serial-bus connector to couple with the network by detecting electric power supplied via the female universal-serial-bus connector.

9. An intelligent network connecting apparatus for serving as a terminal of network, the intelligent network connecting apparatus comprising:

a panel;

a female Ethernet connector mounted on the panel for receiving a male Ethernet connector to couple the intelligent network connecting apparatus with a computer;

a female universal-serial-bus connector mounted on the panel for receiving a male universal-serial-bus connector to couple the intelligent network connecting apparatus with the computer;

a converting means coupling the female universal-serial-bus connector for converting signals in forms of between a universal-serial-bus standard and a Ethernet standard; and an auto-detecting switch coupling with the female Ethernet connector and the converting means, while the computer connects with the female universal-serial-bus connector to send an electric power Vcc and a reference potential GND to the auto-detecting switch, the auto-detecting switch connecting the computer to the network through the converting means automatically, or while the computer connects with the female Ethernet connector, the auto-detecting switch connecting the computer to the network.

10. The intelligent network connecting apparatus of claim 9, wherein the female Ethernet connector is a standard female RJ-45 connector.

11. The intelligent network connecting apparatus of claim 9, wherein the panel is mounted on a wall of architecture.

12. The intelligent network connecting apparatus of claim 9, wherein the panel, the converting means, and the auto-detecting switch are implanted as a mobile switch device.

13. The intelligent network connecting apparatus of claim 9, further comprising an LED device on the panel for indicating which connector between the female Ethernet connector and the female universal-serial-bus connector has been used.

14. The intelligent network connecting apparatus of claim 9, wherein the auto-detecting switch is a relay.

* * * * *